United States Patent [19]

Kruger

[11] Patent Number: 5,013,058

[45] Date of Patent: May 7, 1991

[54] VARIABLE WHEEL BASE TRAILER APPARATUS

[76] Inventor: Paul C. Kruger, 730 Fairlawn Dr., Columbus, Ohio 43214

[21] Appl. No.: 470,375

[22] Filed: Jan. 25, 1990

[51] Int. Cl.$^5$ .............................................. B62D 53/08
[52] U.S. Cl. ................................. 280/429; 280/149.2; 280/475
[58] Field of Search ............ 280/429, 430, 431, 149.2, 280/405.1, 467, 469, 475, 477

[56] References Cited

U.S. PATENT DOCUMENTS

| | | | |
|---|---|---|---|
| 2,826,429 | 3/1958 | Holland | 280/429 |
| 3,895,818 | 7/1975 | Fearon | 280/81.1 |
| 4,204,697 | 5/1980 | Santerre | 280/149.2 |
| 4,353,565 | 10/1982 | Smith et al. | 280/149.2 |
| 4,365,820 | 12/1982 | Rush | 280/149.2 |

FOREIGN PATENT DOCUMENTS 701310 1/1941 Fed. Rep. of Germany ...... 280/475

Primary Examiner—Charles A. Marmor
Assistant Examiner—Mitchell Bompey
Attorney, Agent, or Firm—Leon Gilden

[57] ABSTRACT

An apparatus is set forth to vary the wheel base configuration of a tractor-trailer apparatus, wherein the trailer is positionable upon a carriage mounted upon "C" shaped channel guide rails mounted on the framework of a tractor organization. The rails include a reciprocating carriage mounted thereon for engagingly latching and reciprocatingly positioning and securing the trailer relative to the tractor framework, whereupon retraction of the carriage simultaneously secures the trailer to the tractor and elevates the rear tractor wheels out of contact with an associated roadway. An electrical interlock is provided for indicating proper orientation of the trailer relative to the tractor.

11 Claims, 5 Drawing Sheets

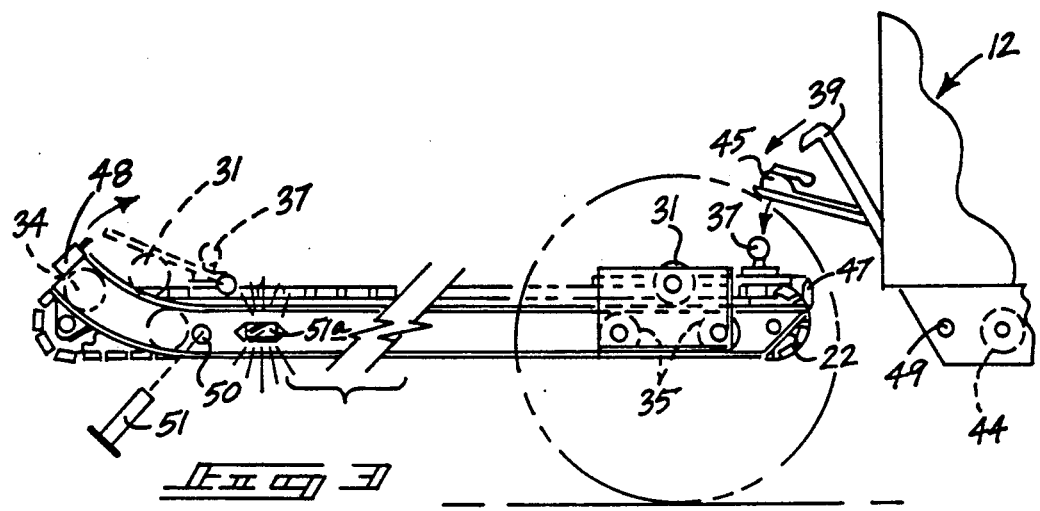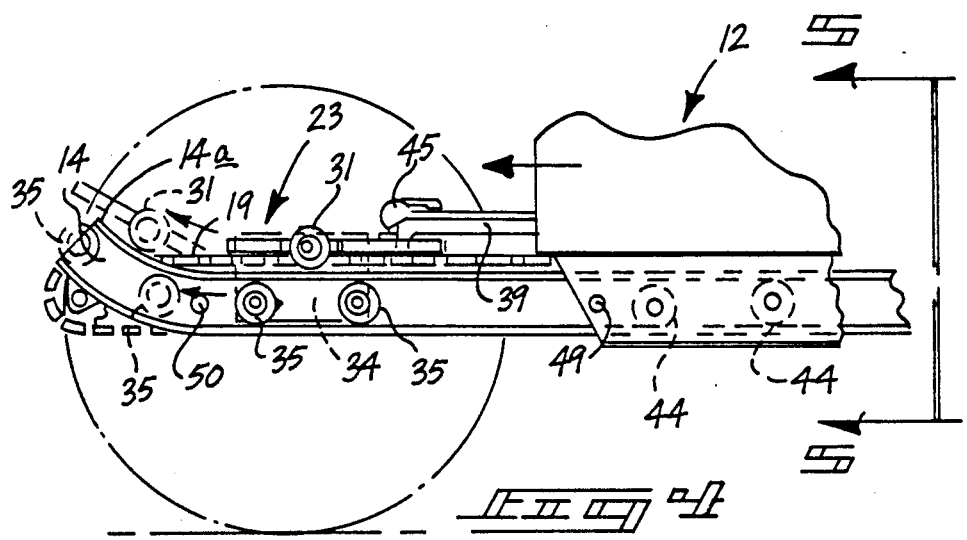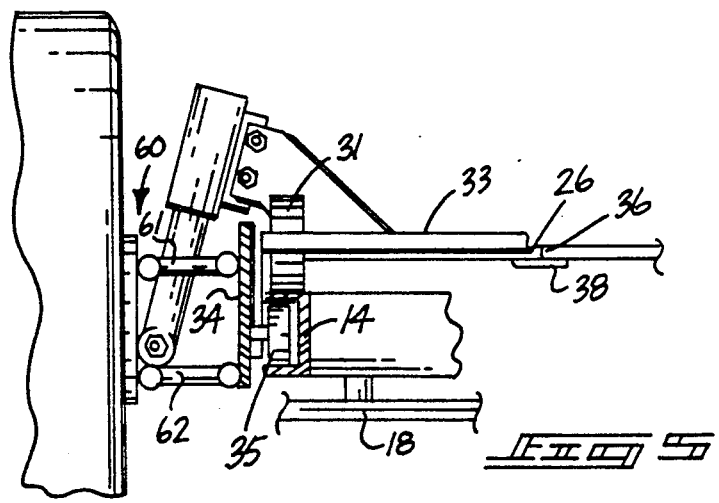

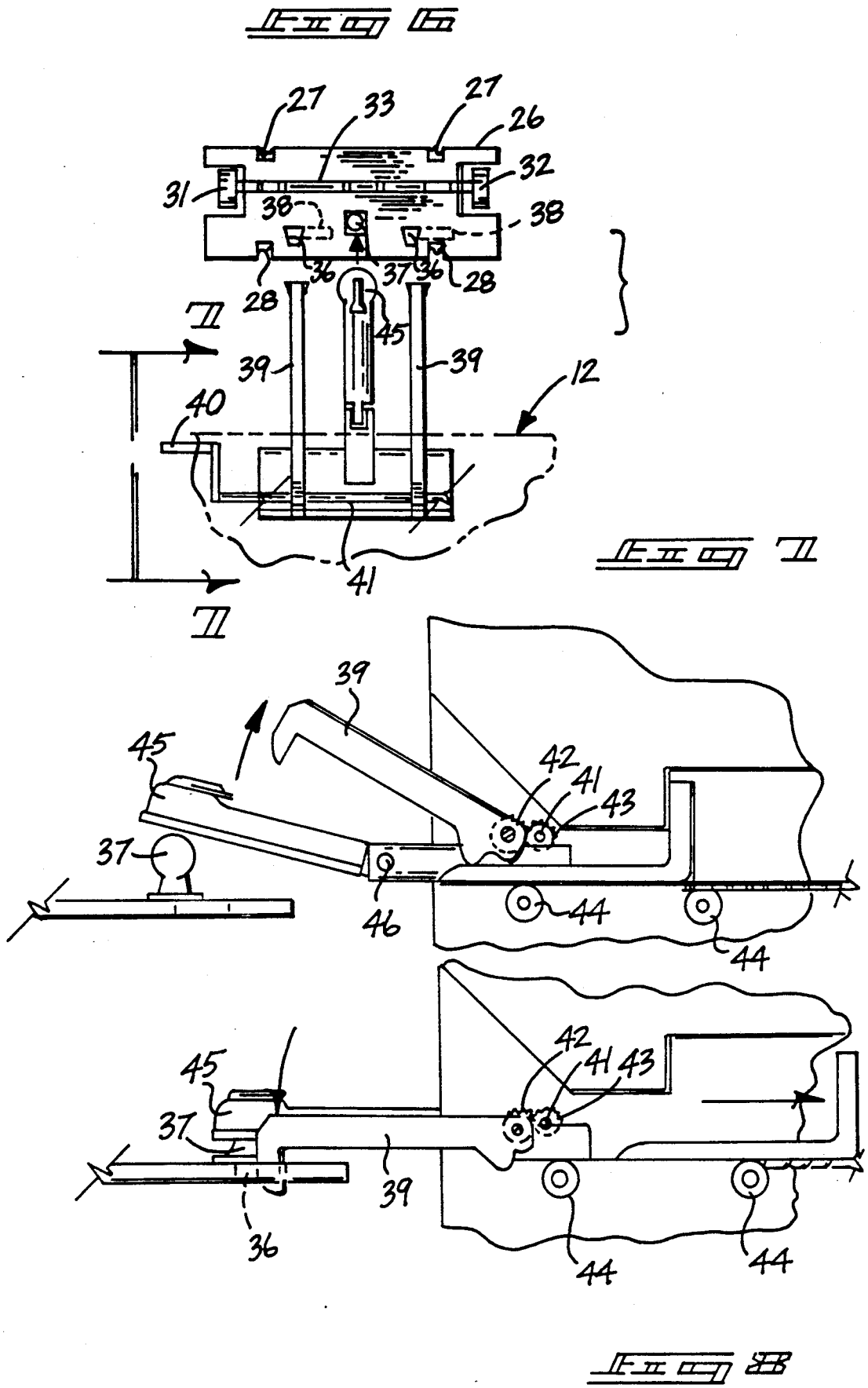

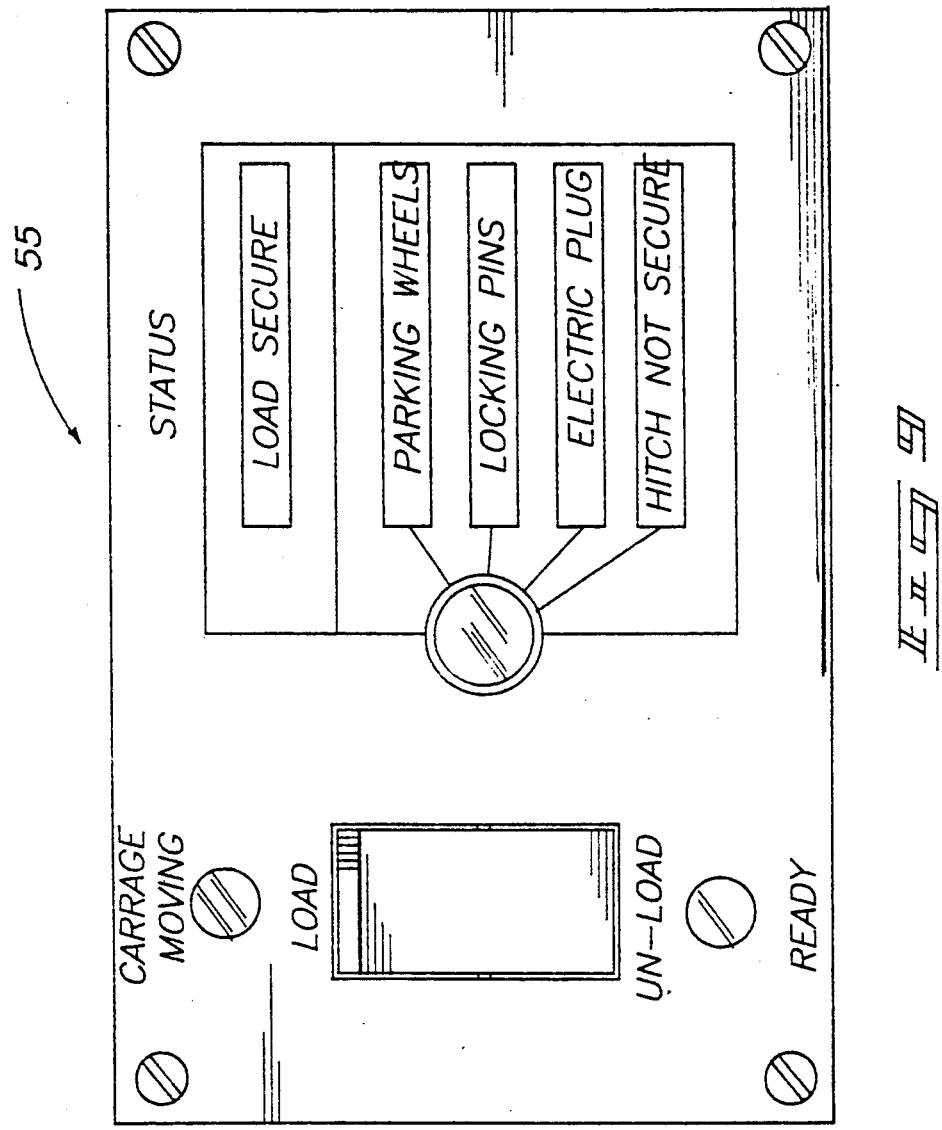

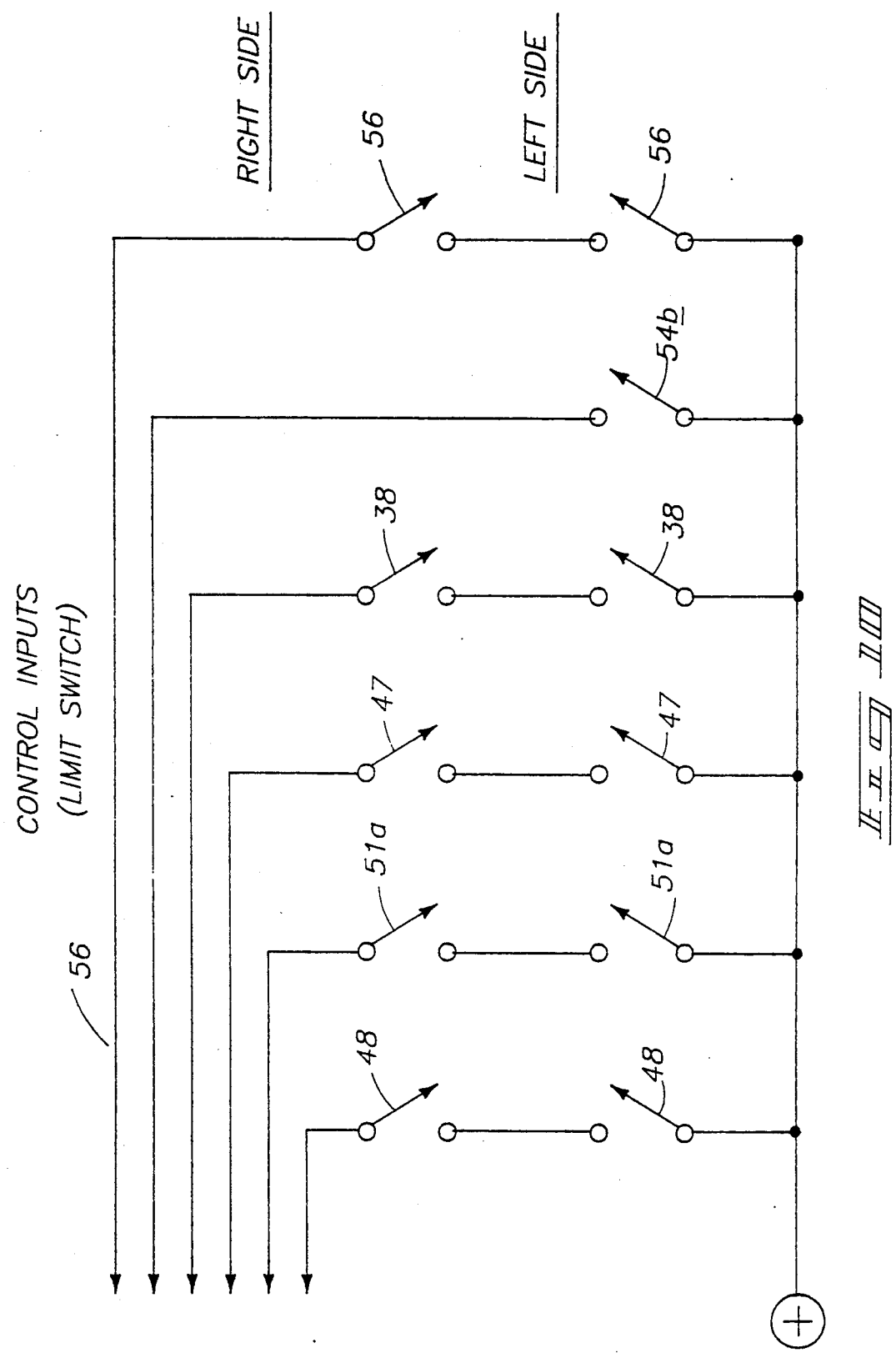

VARIABLE WHEEL BASE TRAILER APPARATUS

BACKGROUND OF THE INVENTION

1. Field of the Invention

The field of invention relates to tractor-trailer apparatus, and more particularly pertains to a new and improved variable wheel base tractor-trailer apparatus wherein the same utilizes a reciprocating carriage mounted on the tractor to position the trailer relative to the tractor.

2. Description of the Prior Art

Organizations for the convenient loading and unloading of a trailer organization relative to a pulling tractor is available in the prior art for the convenience in the securement of the trailer to the tractor. The load associating and disassociating organization of the instant invention attempts to overcome the deficiencies of the prior art in the ease of securement of a tractor relative to a trailer to be pulled thereby. Examples of tractor-trailer organizations in the prior art include U.S. Pat. No. 4,531,753 to Hicks providing a pedestal slidable along the framework of the trailer body on pads with locking wedges to lock the pedestal in an orientation relative to the tractor.

U.S. Pat. No. 4,273,347 to Hulse sets forth a latching of a rear wheel carriage relative to a trailer organization utilizing a latch pin arrangement therefore.

U.S. Pat. No. 4,353,565 to Smith, et al., sets forth a slide arrangement relative to a trailer of a tractor-trailer assemblage wherein centers are spaced apart on the trailer for indication of the wheel base variation relative to the trailer in use.

U.S. Pat. No. 4,365,820 to Rush sets forth a trailer organization utilizing running gear that may be slidably mounted relative to a trailer frame for securement to an associated forwardly positioned tractor organization.

U.S. Pat. No. 4,660,843 to Hicks illustrates a tractor-trailer organization with the carriage mounted on the trailer to vary the wheel base and associated pay load of the permitted tractor-trailer assemblage.

As such, it may be appreciated that there is a continuing need for a new and improved variable wheel base tractor-trailer apparatus as set forth by the instant invention wherein the same accommodates repositioning of a trailer relative to a self-propelled tractor utilizing a reciprocating carriage for ease and safety of securement of the trailer relative to the tractor organization, wherein rear tractor wheels are elevated out of contact with a support roadway upon simultaneous securement of a trailer to the organization.

SUMMARY OF THE INVENTION

In view of the foregoing disadvantages inherent in the known types of tractor-trailer organizations now present in the prior art, the present invention provides a variable wheel base tractor-trailer apparatus wherein the same utilizes a reciprocating carriage mounted on a tractor bed for reciprocatingly receiving and securing a trailer relative to the tractor bed. As such, the general purpose of the present invention, which will be described subsequently in greater detail, is to provide a new and improved variable wheel base tractor-trailer apparatus which has all the advantages of the prior art tractor-trailer apparatus and none of the disadvantages.

To attain this, the present invention includes a trailer framework utilizing a carriage which incorporates a plurality of drive chains actuatable by a forwardly positioned drive motor, wherein the drive motor is reversible to reciprocate the carriage relative to the tractor framework. A carriage mounted on the tractor framework includes a "C" shaped guide rail, wherein the carriage includes a series of guide wheels positioned for rotating engagement interiorly and overlying the "C" shaped guide rails to reciprocate the carriage thereon. The carriage includes a hitch ball and a plurality of trapezoidal openings for receiving complementary latching members mounted to the trailer. Limit switch members are positioned forwardly and rearwardly of the guide rails for indication of proper position of the carriage relative to the framework for disengagement and engagement of the trailer, wherein the trailer utilizes indicator means for indication of the trailer wheels in a lowered or non-lowered orientation, with further indicator members for positioning of the latch members of the trailer and lock pins directed through the guide rails for securement of the carriage in a forwardly oriented position for transport of the body.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved variable wheel base tractor body apparatus which has all the advantages of the prior art tractor-trailer apparatus and none of the disadvantages.

It is another object of the present invention to provide a new and improved variable wheel base tractor body apparatus which may be easily and efficiently manufactured and marketed.

It is a further object of the present invention to provide a new and improved variable wheel base tractor body apparatus which is of a durable and reliable construction.

An even further object of the present invention is to provide a new and improved variable wheel base tractor body apparatus which is susceptible of a low cost of manufacture with regard to both materials and labor, and which accordingly is then susceptible of low prices of sale to the consuming public, thereby making such variable wheel base tractor-trailer apparatus economically available to the buying public.

Still yet another object of the present invention is to provide a new and improved variable wheel base tractor body apparatus which provides in the apparatuses and methods of the prior art some of the advantages thereof, while simultaneously overcoming some of the disadvantages normally associated therewith.

Still another object of the present invention is to provide a new and improved variable wheel base tractor body apparatus wherein the same is provided with a reciprocating carriage mounted to guide rails overlying a tractor framework for reciprocating a trailer relative to the framework and thereby enhance ease of engagement and disengagement of the trailer relative to the tractor.

These together with other objects of the invention, along with the various features of novelty which characterize the invention, are pointed out with particularty in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view taken in elevation of a tractor-trailer apparatus utilized in the instant invention.

FIG. 2 is an orthographic view taken along the lines 2—2 of FIG. 1 in the direction indicated by the arrows.

FIG. 2a is an orthographic view taken along the lines 2a—2a of FIG. 2 in the direction indicated by the arrows.

FIG. 3 is an orthographic side view illustrating the reciprocating carriage and guide rails prior to securement of the trailer thereto.

FIG. 4 is an orthographic side view taken in elevation of the guide rails and trailer in a medial position in transport overlying the guide rails.

FIG. 5 is an orthographic cross-sectional view of the carriage and guide rail arrangement.

FIG. 6 is a top orthographic view of the carriage of the instant invention.

FIG. 7 is an orthographic view taken along the lines 7—7 of FIG. 6 indicating the latch members of the trailer organization in a raised configuration.

FIG. 8 is an orthographic side view of the instant invention illustrating the latch members of the trailer in a lowered position relative to the carriage.

FIG. 9 is an orthographic view taken in elevation of an indicator panel for use interiorly of the tractor for indication of proper positioning of the various components of the instant invention.

FIG. 10 is a diagrammatic illustration of indicator switches utilized by the instant invention.

DESCRIPTION OF THE PREFERRED EMBODIMENT

Figures 1, 2, 2A:
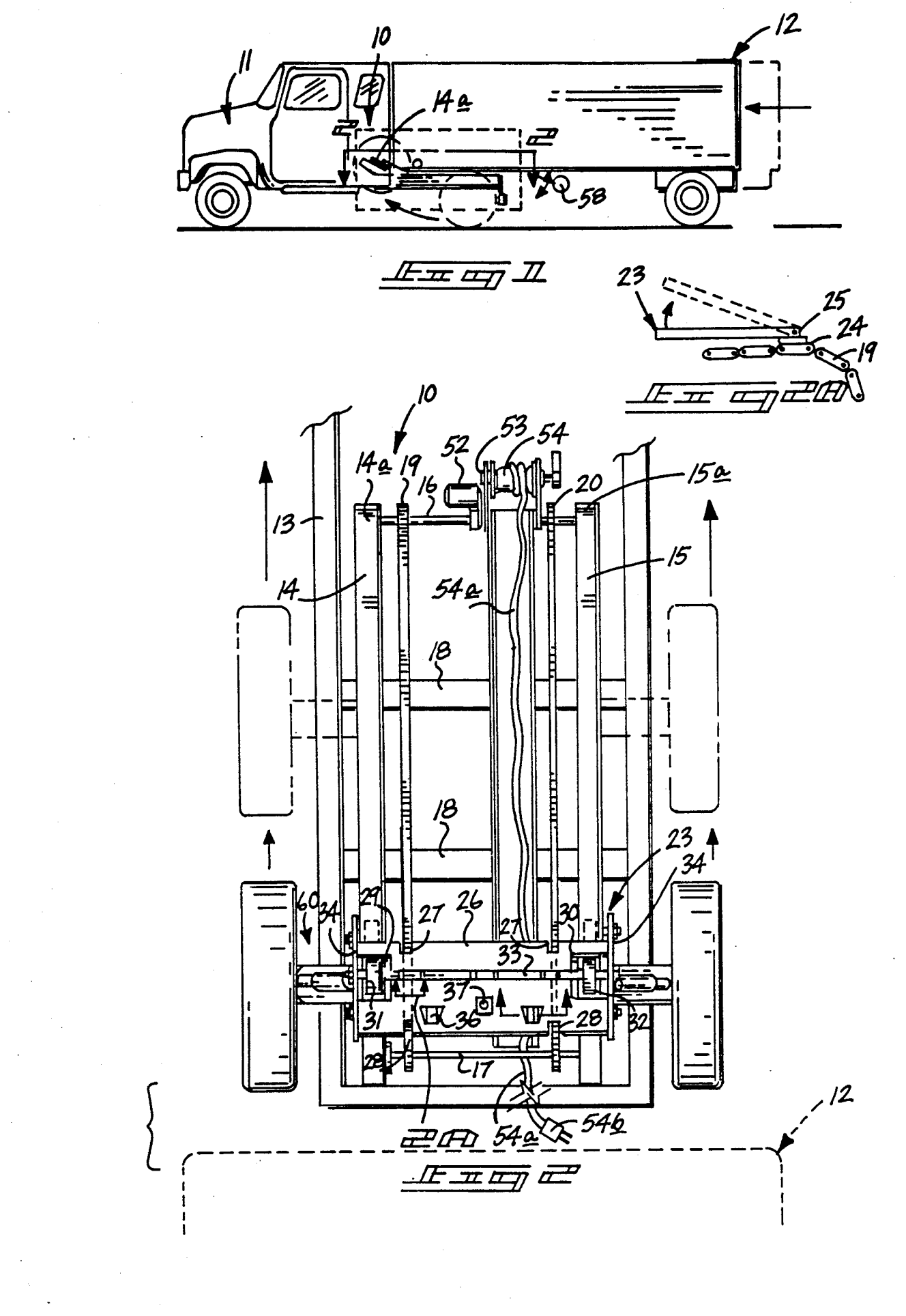

With reference now to the drawings, and in particular to FIGS. 1 to 10 thereof, a new and improved variable wheel base tractor-trailer apparatus embodying the principles and concepts of the present invention and generally designated by the reference numeral 10 will be described.

More specifically, the variable wheel base tractor-trailer apparatus 10 essentially comprises a self-propelled vehicular tractor 11 for mounting a trailer 12 rearwardly thereof. The tractor 11 includes a rearwardly extending tractor framework 13 rotatably mounting the rear wheel assemblies of the tractor organization, and further mounting overlying the tractor framework 13 a first and second "C" shaped guide rail 14 and 15 respectively, wherein the guide rails are mounted in a parallel relationship relative to one another and the framework 13 and longitudinally aligned with the tractor framework, as illustrated in FIG. 1 for example. The guide rails include a respective first and second arcuately forward guide rail portion 14a and 15a that extend vertically above the horizontally extending surfaces of the guide rails 14 and 15. The forward guide rail portions 14a and 15a mount a forward axle 16 with a rear axle 17 mounted adjacent rear terminal ends of the respective guide rails 14 and 15, as illustrated in FIG. 2. The forward and rear axles 16 and 17 include respective pairs of forward and rear sprockets 21 and 22 to mount spaced parallel first and second continuous conveyor chain members 19 and 20 operatively associated with the forward and rear axles for rotation of the sprockets by rotation of the forward axle 16 by use of a reversible drive motor 52 utilizing a drive gear or chain 53 to rotate the forward axle 16 and the associated first and second chain members 19 and 20. Cross braces 18 are utilized to mount the guide rails 14 and 15 to the tractor framework 13 in a spaced relationship above the tractor framework to slidingly receive the trailer organization 12 thereon.

Reciprocatably mounted upon the "C" shaped guide rails 14 and 15 is a rectangular trailer carriage 23 extending laterally beyond the sides of the guide rails 14 and 15 mounting a wheeled assembly to enable reciprocation thereon. The trailer carriage 23 is secured to each of the first and second chain members 19 and 20. A connector link 24 pivotally mounts the trailer carriage 23 upon the chain members at a position forwardly of and adjacent a rear longitudinal edge of the trailer carriage, as illustrated in FIG. 2a for example, to enable pivotment of the trailer carriage as it is directed forwardly over the guide rails 14 and 15 overlying the forward guide portions 14a and 15a that are angulated upwardly of the guide rails, as illustrated in FIG. 3 for example. The trailer carriage 23 is defined by the rectangular carriage platform 26, including forward chain notches 27 and rear chain notches 28 to enable and accommodate pivotment of the carriage platform 26, as noted above. A first and second relief opening 29 and 30 is positioned overlying the first and second guide rails 14 and 15 directed inwardly of side edges of the carriage platform 26, wherein an upper first wheel 31 is directed rotatably through the first relief opening 29 with an upper second wheel 32 directed through the second opening 30 overlying upper surfaces of the longitudinal guide rails 14 and 15 respectively. An upper carriage axle 33 is mounted onto an upper surface of the carriage platform 26 and rotatably mounts the first and second wheels 31 and 32. Spaced vertical carriage plates 34 are fixedly mounted orthogonally relative to side edges of the carriage platform 26 and directed downwardly extending overlying and beyond the guide rails 14 and 15 and mount lower carriage wheels comprising forward and rear pairs of channel wheels 35, as illustrated in FIGS. 4 and 5 for example. A carriage wheel assembly 60 is mounted to each of the spaced carriage plates 34 and extending beyond the carriage 23 for supportive rolling engagement of a support roadway when the carriage is in an extended position, as illustrated in FIG. 2 for example. The carriage 23 in its ascent over the forward guide portions 14a and 15a (see FIG. 1) elevates the wheel assemblies 60 and their associated support links 61 and 62 out of contact with a supoport roadway as the unitary securement of the trailer organization 12 with the framework 13 provides support for the assembled tractor 11 and trailer 12 with the effective wheel base determined by the forward wheels of the tractor 11 and the rear wheels of the trailer 12, as illustrated in FIG. 1.

The lower carriage wheels 35 (see FIG. 5) are captured within the "C" shaped guide rails 14 and 15. Formed through the carriage platform 26 are a pair of spaced trapezoidal openings 36 for reception of pivoted latch members 39 mounted to the trailer organization 12. Latch sensors 38 are mounted adjacent the trapezoidal openings 36, as illustrated in FIGS. 5 and 6 for example, with a forwardly oriented sensor plate underlying the respective trapezoidal opening to sense the forward nose of each of the pivoted latch members 39 when positioned through a respective trapezoidal opening. A hitch ball 37 is directed upwardly and orthogonally and positioned between the trapezoidal openings for reception of a hitch member and socket 45 pivotally mounted to the trailer for securement onto the hitch ball 37. A crank handle 40 includes a crank shaft 41 directed through latch member gears 42 that are in operative association with crank shaft gears 43, whereupon rotation of the crank handle 49, the crank shaft 41 is rotated effecting engagement of the crank shaft gears 43 with the latch member gears 42 to effect upward and lower pivotment of the pivotal latch members 39 to raise and lower the latch members 39 with respect to the trapezoidal openings 36.

The trailer 12 includes trailer rail guide wheels 44, wherein a plurality of such pairs of wheels 44 are mounted on each side of downwardly depending flanges of the trailer 12 and are aligned with the "C" shaped channels of the guide rails 14, whereupon forward reciprocation of the carriage 23 pulls the trailer rail guide wheels 44 forwardly and into captured alignment with the "C" shaped guide rails 14 and 15, whereupon it is apparent that the spacing of the guide wheels 44 is equal to that of the spacing of the upper wheels 31 and the carriage channel wheels 35 mounted on the carriage 26.

Upon securement of the hitch member and socket 45 overlying the hitch ball 37 by means of the hitch member pivot 46, the pivotal latch members 39 are directed downwardly and into reception within the trapezoidal openings 36 and into sensor contact with the latch sensors 38 for panel indication of interlocking of the panels, as illustrated in FIG. 10. A rear carriage limit switch 47 is positioned adjacent a rear portion of the guide rails 14 and 15, as illustrated in FIG. 3, for contact with the carriage 23 when in a rearward position, wherein a forward limit switch 48 is positioned adjacent and in alignment with a forward edge of the forward portions 14a and 15a of the guide rails 14 and 15 for indication of proper positioning of the carriage. The tilting of the carriage, as illustrated in FIG. 3 in a forwardmost position repositiong the carriage wheel assemblies 60 out of contact with an associated roadway as noted above in the formation of a unitary (non-pivoting) tractor-trailer arrangement. Further, a trailer lock aperture 49, as illustrated in FIGS. 3 and 4 for example, is positioned in alignment with a guide rail lock apertures 50 positioned through each guide rail 14 and 15 to receive a lock pin 51, whereupon indicator light 51a is illuminated indicating proper alignment and positioning of the lock pin 51 within each of the apertures 50 and 49, as further illustrated in FIG. 10 for indication of the indicator lights 51a upon proper contact of the lock pin 51 within the apertures. Furthermore, a cable drum 54 is mounted forwardly of the guide rails 14 and 15, as illustrated in FIG. 2, for housing of a trailer electrical conduit 54a for electrical hydraulic and air association with a trailer electrical connector 54b to provide energy to the trailer for actuation of brakes, if desired, and such indication is effected, as illustrated in FIG. 10, and upon a panel, as illustrated in FIG. 9, that is positioned within the cab. The panel 55 is positioned for securement within the tractor cab for visual understanding by an operator. Further, the use of trailer wheel limit switches 56 in cooperation with the trailer parking wheels 58 is provided, whereupon an orthogonal orientation of the trailer parking wheels 58 in a latched position is provided for indication upon the panel 55. It is further understood that pneumatic connection of the tractor relative to the trailer may be provided in a conventional manner, as well as further indicator lights for indication of the positioning of the cable drum 54 and the like during use for convenience and safety in operation of the organization.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A variable wheel base tractor-trailer apparatus for roadway travel comprising, in combination, a self-propelled tractor assembly with a longitudinal rearwardly extending tractor frame including a forward set of drive wheels, and a wheeled trailer assembly selectively securable to the tractor assembly, wherein the trailer assembly includes a plurality of pivotally mounted parking wheels medially positioned underlying the trailer assembly, and a reciprocating carriage means for selective securement to the trailer assembly, movably mounted to a plurality of elongate guide members, wherein the guide members comprise a first and second elongate guide rail for slidably receiving the carriage means thereon, the carriage means including first and second tractor supporting carriage wheel assembly secured to and directed laterally of each side of the carriage means, each carriage wheel assembly aligned relative to one another and to the carriage means, and wherein the first and second guide rails include a first and second respective forward portion, wherein the first and second forward portion each include an arcuate forward upper surface directed overlying and spaced above the first and second guide rails, and a forward limit switch mounted in alignment with forward edges of the first and second guide rail portions for contact with the carriage means in a forward position, and a second limit switch mounted adjacent and in alignment with rear edge portions of the first and second guide members for contact with the carriage means when in a retracted rear position, and the first and second carriage wheel assembly in a roadway contacting orientation in the rear position, and the first and second carriage wheel assembly spaced above a roadway in the forward position, and including first and second continuous chain members, the first and second chain members are spaced parallel to one another and between the first and second guide rails, and the carriage means includes a carriage platform, the carriage platform pivotally mounted to the first and second chain members.

2. A variable wheel base tractor-trailer apparatus as set forth in claim 1 wherein the carriage platform includes a first and second upper guide wheel, the first and second upper guide wheel rotatably mounted for engagement with an upper surface of a respective first and second guide rail, the first and second upper guide wheel including an upper axle securing and rotatably mounting the first and second upper guide wheel and the upper axle mounted onto the carriage platform, and carriage support plates mounted orthogonally to spaced side edges of the carriage platform extending below the carriage platform and exteriorly of the first and second guide rail, and the vertical carriage support plates including plural pairs of lower guide wheels, the lower pair of guide wheels cooperating with the first and second guide rails interiorly thereof.

3. A variable wheel base tractor-trailer apparatus as set forth in claim 2 wherein the first and second guide rails are "C" shaped and the plurality of pairs of lower guide wheels are rotatably mounted and captured within the "C" shaped guide rails aligned with and below the upper guide wheels.

4. A variable wheel base tractor-trailer apparatus as set forth in claim 3 wherein the first and second continuous chain members include respective first and second forward sprockets mounted upon a single forward axle, wherein the forward axle is orthogonally mounted between the forward guide rail portions, and the first and second continuous chain members including a first and second rear sprocket, the first and second rear sprocket rotatably mounted upon a rear axle, the rear axle orthogonally and integrally mounted between rear terminal ends of the first and second guide rails.

5. A variable wheel base tractor-trailer apparatus as set forth in claim 4 wherein the trailer assembly includes at least one downwardly depending flange directed downwardly from each side wall of the tractor trailer assembly with a plurality of trailer assembly wheels rotatably mounted interiorly of each flange, wherein the trailer assembly wheels are spaced apart a predetermined distance equal to a predetermined distance defined by the "C" shaped channels of the first and second guide rails.

6. A variable wheel base tractor-trailer apparatus as set forth in claim 5 wherein the trailer assembly includes a plurality of pivotal latch members, the pivotal latch members each include a respective gear, each gear associated with a respective crank gear, each crank gear associated with each pivotal latch member aligned relative to one another with a crank shaft directed therethrough, the crank shaft including a handle member mounted orthogonally relative to the crank shaft for rotation of the crank shaft to effect pivotal rotation of the pivotal latch member interiorly and exteriorly of trapezoidal opening formed within the carriage platform.

7. A variable wheel base tractor-trailer apparatus as set forth in claim 6 including carriage limit switch members positioned underlying each trapezoidal opening for contact with the pivotal latch members when received through the trapezoidal openings.

8. A variable wheel base tractor-trailer apparatus as set forth in claim 7 including a trailer lock aperture positioned through each downwardly directed flange of the trailer assembly and oriented for alignment with a guide rail lock aperture directed through each of the first and second guide rails for reception of a lock pin through each of the trailer lock apertures and the guide rail lock apertures, and switch means aligned with the trailer lock apertures and the guide rail lock apertures for sensing reception of the lock pin therethrough.

9. A variable wheel base tractor-trailer apparatus as set forth in claim 8 wherein the carriage platform includes a first and second opening adjacent each side edge of the carriage platform for accommodating the upper first and second guide wheels therethrough, wherein the first and second guide wheels are directed through each of the first and second openings for contact with an upper surface of each of the first and second guide rails respectively.

10. A variable wheel base tractor-trailer apparatus as set forth in claim 9 including a reversible motor for rotatably driving the forward axle to reciprocate the carriage platform forwardly and rearwardly of the first and second guide rails upon rotation of the first and second chain members.

11. A variable wheel base tractor-trailer apparatus as set forth in claim 10 wherein the motor may be electrically or hydraulically activated.

* * * * *